United States Patent [19]

Zimmerman et al.

[11] Patent Number: 4,690,501
[45] Date of Patent: Sep. 1, 1987

[54] ULTRAVIOLET CURABLE OPTICAL GLASS FIBER COATINGS FROM ACRYLATE TERMINATED, END-BRANCHED POLYURETHANE POLYUREA OLIGOMERS

[75] Inventors: John M. Zimmerman, Schaumburg; Gerry K. Noren, Hoffman Estates; Timothy E. Bishop, Algonquin, all of Ill.

[73] Assignee: DeSoto, Inc., Des Plaines, Ill.

[21] Appl. No.: 752,582

[22] Filed: Jul. 8, 1985

[51] Int. Cl.$^4$ .............. C08F 2/50; C08F 126/02; C08F 26/02; G02B 6/22
[52] U.S. Cl. .............. 350/96.29; 350/96.33; 428/378; 522/96; 522/97; 526/301
[58] Field of Search .............. 522/92, 97, 96; 350/96.29, 96.33; 526/301

[56] References Cited

U.S. PATENT DOCUMENTS

| | | | |
|---|---|---|---|
| 3,864,133 | 2/1975 | Hisamatsu | 430/284 |
| 3,891,523 | 6/1975 | Hisamatsu | 525/455 |
| 4,078,118 | 3/1978 | Moyer | 522/97 |
| 4,097,439 | 6/1978 | Darling | 525/455 |
| 4,117,017 | 9/1978 | Morgan | 522/97 |
| 4,150,167 | 4/1979 | Mathias | 522/97 |
| 4,320,220 | 3/1982 | Pampouchidis | 524/555 |
| 4,472,019 | 9/1984 | Bishop | 522/92 |
| 4,495,271 | 1/1985 | Geissler | 522/97 |
| 4,590,250 | 5/1986 | Ansel | 526/301 |
| 4,608,409 | 8/1986 | Coady | 526/301 |

*Primary Examiner*—John C. Bleutge
*Assistant Examiner*—A. H. Koeckert
*Attorney, Agent, or Firm*—Dressler, Goldsmith, Shore, Sutker & Milnamow, Ltd.

[57] ABSTRACT

Ultraviolet curing oligomers and liquid coating compositions based thereon are disclosed which cure with ultraviolet light in the presence of a photoinitiator. The coating compositions can provide either a single coating for optical glass fiber which resists microbending difficulties down to around −40° C., or a topcoat for overcoating softer buffer coatings which resist microbending down to around −60° C. The coating compositions consist essentially of the linear polyacrylate-terminated polyurethane polyurea oligomer in admixture with an ultraviolet curable liquid acrylate or polyacrylate to provide the liquidity needed for application and to adjust the hardness or softness of the cured coating for the selected single coat or topcoat utility. The oligomer contains a linear polyurethane core terminated by urea formation with a polyhydroxy-functional amine containing a single isocyanate-reactive amino hydrogen atom. The plurality of hydroxy-terminated branches provided by the amine are capped with an acrylate-functional compound, and the several acrylate-functional branches increase the toughness and the cure speed.

24 Claims, No Drawings

ULTRAVIOLET CURABLE OPTICAL GLASS FIBER COATINGS FROM ACRYLATE TERMINATED, END-BRANCHED POLYURETHANE POLYUREA OLIGOMERS

DESCRIPTION

1. Technical Field

This invention relates to ultraviolet curable coating compositions based on linear oligomers which have terminal acrylate-functional branches which increase toughness and speed the ultraviolet cure, and includes the new oligomers. These compositions may be employed either as a single coating applied directly to the optical fiber, or as an overcoating on buffer coated optical fiber to improve the physical properties of the coated fiber.

2. Background Art

Optical glass fiber must be coated to protect its surface against abrasion. Since heat-cured coatings are slow curing, it has been desired to employ ultraviolet-curing coating compositions. This proved to be difficult in practice because the optical fiber must be expected to encounter a wide range of service temperatures, including very low service temperatures. The usual ultraviolet-cured coatings are either too hard initially, or become too hard at the lower service temperatures. This excessive hardness causes the difference between the thermal coefficient of expansion of the coating and the thermal coefficient of expansion of the glass to produce microbends in the fiber when low service temperatures are encountered. These microbends interfere with the capacity of the fiber to convey optical messages.

Industry experienced great difficulty in providing ultraviolet curing coatings which would have enough strength at room or expected elevated service temperature to protect the glass surface against mechanical stress without inducing microbending difficulties at low service temperature until R. E. Ansel, in Ser. No. 170,148 filed July 18, 1980, now U.S. Pat. No. 4,624,994, found that certain urethane oligomer diacrylates could be combined with appropriate mixtures of monoethylenically unsaturated monomers including a large proportion of a monomer of low glass transition temperature to provide a primer or buffer coating which could be overcoated with a stronger and harder topcoat to provide the combination of properties which was needed.

Unfortunately, the coatings disclosed in the aforesaid Ansel application are only able to resist temperatures down to around $-40°$ C., and they require overcoating. While other ultraviolet-cured coatings having better low temperature properties have been found, these are softer at room temperature, and thus more in need of overcoating.

Accordingly, one objective of this invention is to provide ultraviolet-curable coatings which combine reasonably good low temperature microbending resistance with sufficient room temperature strength to be useful in the absence of topcoating.

Optical fibers not only encounter low service temperatures, but they also encounter elevated service temperatures. Those coatings which provide good low temperature characteristics are frequently much too soft at room or elevated service temperature, and thus must be topcoated. It has therefore been found desirable to topcoat a buffer coated optical glass fiber with a tough and flexible overcoat possessing superior resistance to moisture and abrasion. To obtain the desired properties in optical glass fibers which have been buffer coated, resort has been had to the use of extruded Nylon "jacket" coatings, but these are more expensive and difficult to apply than ultraviolet-cured coatings.

It is also known to apply both the buffer coating and the topcoating at high speed using an ultraviolet-curable topcoat on top of a buffer coating which has been ultraviolet cured, but the ultraviolet-cured topcoats have not possessed the desired strength and resistance to rupture without being inadequately flexible.

Another objective of this invention is to provide ultraviolet-curable topcoatings which will substantially duplicate the properties now obtained using the extruded "jacket" coatings noted above so that high speed coating procedures can be used to economically produce buffer coated and topcoated optical glass fiber which will satisfy the demanding commercial requirements which are insisted upon.

DISCLOSURE OF INVENTION

In accordance with this invention, an ultraviolet curing liquid coating composition is provided which, when cured with ultraviolet light in the presence of a photoinitiator, provides a single coating for optical glass fiber having adequate strength at room or expected elevated temperature (and is stable at such elevated temperature) and which can resist microbending difficulties down to around $-40°$ C., or which can be used to overcoat softer buffer coatings which can remain soft to resist microbending difficulties down to around $-60°$ C. This coating composition consists essentially of a linear polyacrylate-terminated polyurethane polyurea oligomer which contains a linear polyurethane core which has been terminated by urea formation with a polyhydroxy-functional amine containing a single isocyanate-reactive amino hydrogen atom, the hydroxy functionality provided by the amine being capped with an acrylate-functional compound, the oligomer being used in admixture with an ultraviolet curable liquid acrylate or polyacrylate to provide the liquidity needed for application and to adjust the hardness or softness of the cured coating for the selected single coat or topcoat utility. The invention includes the new linear oligomers with their branched extremities.

As will be evident, the branching produced by the presence of the amine component and the formation of a urea group from the amino hydrogen atom increases the hardness and strength of the cured coating. This branching also results in the presence of a plurality of acrylate groups at each end of the oligomer which is formed, and this considerably speeds the cure which is a vital aspect of the practical coating of optical glass fiber.

Suitable polyhydroxy amines are illustrated by the preferred diethanol amine, and also by dipropanol amine, and the reaction product of a monosecondary amine, like butyl amine, with a molar proportion of an hydroxy-functional monoepoxide, such as a monoester of a diglycidyl ether of a bisphenol, like bisphenol A, having a molecular weight of from 375 to 1000. The butyl ester will illustrate these monoepoxides.

It will also be noted that the above amines are monoamines, and it does not matter whether the amine group is primary or secondary. This is because only one of the two amino hydrogen atoms in a primary amine will react with the isocyanate group. Primary amines are illustrated by a compound having the formula: CH$_2$OH-CHOHCH$_2$NH$_2$.

In the preferred coating compositions, the polyacrylate oligomer should constitute at least about 30% of the reactive components in the coating, preferably at least about 40%. As a practical matter, the polyacrylate oligomer will not exceed about 80% of the coating composition, preferably not more than 70%.

The properties needed for single coat application are a tensile modulus less than about 20,000 and the capacity to resist microbending down to about −40° C. The properties needed in an ultraviolet-curable topcoating composition can be identified by reference to the testing of a 3 mil test film peeled from a glass support on which it was formed and cured by ultraviolet exposure. The film should possess a tensile strength of at least 2000 psi. in combination with a room temperature (25° C.) tensile modulus of at least 50,000 psi. to identify proper performance for topcoat application. Prior ultraviolet-cured coatings having this considerable strength lacked desired flexibility, evidenced by an elongation of less than 20%.

Previous efforts to provide appropriate topcoating compositions have been successful, but those compositions must include acrylic acid to have reasonable ultraviolet cure speed, and even then the cure speed obtained in this invention is better than the prior compositions containing acrylic acid.

The buffer coatings which may be overcoated will vary considerably, but these are characterized by a relatively low tensile modulus at room temperature. It is because the buffer coating on the optical glass fiber has a room temperature modulus below about 1000 psi, that overcoating becomes important.

Referring more particularly to the ultraviolet curable liquid acrylate or polyacrylate which provides the liquidity needed for application and to adjust the hardness or softness of the cured coating for the selected single coat or topcoat utility, these may be monoacrylates or polyacrylates, as desired. Both of these are well known to provide the viscosity needed for coating application, albeit some are better than others for providing desired curing speed and/or desired softness or hardness.

Thus, when hardness is desired, one will employ a proportion of a polyacrylate having a molecular weight below about 600, such as pentaerythritol triacrylate or trimethylol propane triacrylate. These will be used either alone or together with acrylate-functional monomers of high glass transition temperature, such as dimethyl acrylamide. On the other hand, when softness is desired, one will normally use a monoacrylate having a low glass transition temperature, several of which will be mentioned hereinafter. When high cure speed is desired together with softness, one may use a relatively high molecular weight liquid linear aliphatic diacrylate in which the two acrylate groups are separated by a linear chain containing at least 6 carbon atoms, or where less than 6 carbon atoms are present in the chain, that chain is a part of a polyether or similar oligomer having a molecular weight of from 400 to about 4000, preferably from 600 to 2500. These will be further described hereinafter.

The molecular weights of reactive materials is routinely calculated from the known formula and the measured reactivity, and this molecular weight designation will be used unless otherwise specified.

The use of low molecular weight liquid polyacrylates to harden ultraviolet curing coating compositions is well known, as has been illustrated.

Many acrylate-functional monomers of high glass transition temperature are known for inclusion in radiation-curable coating compositions. These are generally monomers having a glass transition temperature above about 55° C., and are further illustrated by N-vinyl pyrrolidone, isobornyl acrylate, acrylic acid and dicyclopentenyl acrylate. These all render the composition more fluid, which aids application. It is preferred not to use more than 45% of acrylate-functional monomer to avoid excessive fluidity. The N-vinyl pyrrolidone noted above is unusually reactive despite its lack of an acrylate group, and it is considered to be an equivalent of an acrylate-functional compound.

The most rapid curing of the above named monomers is acrylic acid, and it has an offensive odor, irritates skin and eyes, corrodes metals, and introduces water sensitivity. In this invention we obtain high cure speed in the absence of acrylic acid.

Acrylate-functional monomers having a low glass transition temperature, e.g., less than 0° C., preferably less than −20° C., provide flexibility for single coat or topcoat use. The glass transition temperature is measured on a homopolymer of the monomer. Low glass transition temperature acrylate monomers which may be used are ethoxyethoxyethyl acrylate, phenoxyethyl acrylate, dimethylaminoethyl acrylate, butoxyethyl acrylate, 2-hydroxyethyl acrylate, and tetrahydro furfuryl acrylate.

To illustrate liquid polyacrylates which may be used for single coat application, reference is made to liquid linear aliphatic diacrylates in which the two acrylate groups are separated by a molecular weight of at least 400 up to about 4000. The preferred diacrylates for single coat use have a molecular weight of from 600 to 2500 and the two acrylate groups are desirably separated by a polyoxybutylene structure. The preferred polyoxybutylene glycol diacrylates have a molecular weight of from 800 to 2000. Other liquid linear aliphatic diacrylates which may be used are 1,12-dodecyl diacrylate and the reaction product of 2 moles of acrylic acid with one mole of dimer fatty alcohol, these normally having 36 carbon atoms.

Commercially available liquid linear aliphatic diacrylates which may be used are Chemlink products 9000 and 9001 as well as 2000.

The instant compositions normally have an index of refraction above 1.48, and this is preferred for the single coating of optical glass fiber, and they also resist microbending down to around −40° C.

Referring more particularly to the linear polyacrylate-terminated polyurethane polyurea oligomers which are used herein, these may have a molecular weight of about 1000 to about 8000 with one linking group selected from urethane or urea groups for every 300 to 900 units of weight. The linear chain is made from difunctional materials, such as diols, diamines and diisocyanates. The usual diisocyanates are illustrated by toluene diisocyanate and isophorone diisocyanate.

When single coat application is intended, one may elect to introduce desired softness into the polyacrylate-terminated oligomer by employing an organic diisocyanate in which a linear aliphatic chain containing at least 6 carbon atoms separates the two isocyanate groups, and this diisocyanate is reacted with a dihydric polyether or polyester containing alkylene groups having from 1 to 6 carbon atoms and a molecular weight in the range of 500 to 4000, to form a polyurethane diisocyanate which is then completed to provide the polyacrylate-terminated branched structure which characterizes this invention.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate.

The diisocyanates, including the above long chain aliphatic diisocyanate are reacted with a dihydric polyether or polyester, preferably containing alkylene groups having from 1 to 6 carbon atoms (preferably 3 or 4 carbon atoms) and a molecular weight in the range of 500 to 4000. These are illustrated by polyoxyethylene glycol having a molecular weight of 1500, 2000 or 2500, polyoxypropylene glycol of corresponding molecular weight, and polytetramethylene glycol of molecular weight 1000. Polyoxyethylated or polyoxypropylated diols, such as butane diol, hexane diol, polyoxyethylene glycol or polyoxypropylene glycol, are also useful.

Polyesters which may be used are illustrated by polycaprolactone glycols, such as the commercially available Tone 0240 from Union Carbide Corporation which is a polycaprolactone glycol having a molecular weight of about 2000.

The reaction between the previously described diisocyanate, which is used in an excess of preferably one mole of diisocyanate per hydroxy group, and the glycol forms a linear polyurethane diisocyanate.

The above linear polyurethane diisocyanate is then reacted with the polyhydroxy-functional monoamine in an amount to provide about 1.0 equivalent of reactive amino hydrogen per isocyanate functional group on the polyurethane diisocyanate. This provides an hydroxy-functional oligomer which is capped with an acrylate-functional compound. One way to accomplish this is by reacting with excess diisocyanate to form an isocyanate-terminated oligomer which is half end capped with a monohydric acrylate, such as a $C_2$ to $C_4$ hydroxyalkyl acrylate. Alternatively, the monohydric acrylate can first be reacted with one molar proportion of organic diisocyanate to provide a monoethylenic monoisocyanate which is then reacted with the hydroxy-functional oligomer described above.

Any monohydric acrylate may be used to end cap the isocyanate functional oligomers used herein, typically 2-hydroxyethyl acrylate, 2-hydroxypropyl acrylate and 2-hydroxybutly acrylate are also useful. Trimethylol propane diacrylate or pentaerythritol triacrylate will further illustrate the class of useful monohydric alcohols, but here the large number of desired terminal acrylate groups is provided by the large number of hydroxyl groups on the oligomer, so the monohydric monoacrylates are preferred.

One may employ $C_1$ to $C_4$ oxyalkylene diamine in the polyurethane oligomer used herein, thus forming urea groups which are particularly desired when the coatings are used as a topcoat. These diamines have a molecular weight of from 100 to 6000. Typical diamines are amine-terminated polyethers, such as polyoxyethylene, or preferably polyoxypropylene, with the polyether chain providing the bulk of the needed molecular weight. These are specifically illustrated by polyoxypropylene diamine of molecular weight 200, 400 and 2000, and by polyoxyethylene diamine of molecular weight 600.

The linear polyacrylate-terminated polyurethane oligomers of this invention may be used in admixture with various monoacrylates or polyacrylates to provide the liquidity needed for application or to provide the hardness or softness desired for the single coat or topcoat application which is intended. Mixtures of monoacrylates and polyacrylates are also useful.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. Benzophenone is quite effective in this invention, but it is presently preferred to use dimethoxyphenyl acetophenone which is available in commerce under the trade designation Irgacure 651 from Ciba-Geigy, Ardsley, N.Y. These photoinitiators may be used alone or in admixture with one another, and amines, like diethyl amine, can be added as photosensitizer, though this is not normally needed.

The coating compositions of this invention are normally free of volatile organic solvents since these would have to be evaporated before ultraviolet exposure, which would slow the curing system.

Throughout this description and also in the claims, proportions are by weight unless otherwise stated. The invention is illustrated as follows.

EXAMPLE 1

Polyoxypropylene glycol having a molecular weight of about 1000 is reacted with two molar proportions of isophorone diisocyanate to produce a linear diisocyanate. This diisocyanate is then reacted with two molar proportions of diethanol amine to form a diurea having two hydroxy groups at each end of the diurea. This oligomer is now a tetrahydric compound, and it is reacted with four molar proportion of a previously prepared adduct of one mole of isophorone diisocyanate with one mole of 2-hydroxyethyl acrylate. The reactions with the isocyanate group are standard, dibutyl tin dilaurate catalyst being used to promote the hydroxy-isocyanate reactions, and phenoxyethyl acrylate being used to maintain liquidity. As a result, the product is an acrylate-functional polyurethane polyurea oligomer in solution in phenoxyethyl acrylate, the phenoxyethyl acrylate being present in an amount of 19% by weight.

EXAMPLE 2

57.0 parts of the solution product of Example 1 is mixed with 27.0 parts of isobornyl acrylate, 15.0 parts of phenoxyethyl acrylate and 3.0 parts of Irgacure 651. The product was a clear straw-colored liquid having a viscosity of 5750 centipoises. On application to a glass surface and curing with ultraviolet light to provide a cured film having a thickness of 3.0 mil which is removed from the glass and tested, it was found that the tensile strength was 2400 psi, the elongation at room temperature was 81%, the tensile modulus at room temperature was 63,000 psi, and the rupture strength was 1700. The cure speed was rapid, as indicated by the fact that methyl ethyl ketone extraction following cure with only 0.05 Joule per square centimeter of ultraviolet light produced 68% insolubilization.

EXAMPLE 3

The coatings of this invention are applied to freshly drawn optical glass fiber having a diameter of about 125 microns and which had been buffer coated with a very soft buffer coating and cured with ultraviolet light in a thickness of about 125 microns. This buffer coated fiber was then topcoated with the coating composition of Example 2 in a thickness of about 125 microns and cured by passing the coated fiber through two tandemly arranged 10 inch 300 watts medium pressure mercury vapor lamps at 1.5 meters per second.

The topcoat was well cured and well adapted to protect the buffer coated optical fiber.

What is claimed is:

1. An ultraviolet curing liquid coating composition which, when cured with ultraviolet light in the presence of a photoinitiator, either provides a single coating for optical glass fiber having adequate strength at room or expected elevated temperature, and a low tensile modulus which remains low to resist microbending difficulties down to around −40° C., or which can be used to overcoat softer buffer coatings which remain soft to resist microbending difficulties down to around −60° C., said coating composition consisting essentially of a linear polyacrylate-terminated polyurethane polyurea oligomer containing a linear polyurethane core terminated at both ends by urea formation with a polyhydroxy-functional amine containing a single isocyanate-reactive amino hydrogen atom, the plurality of hydroxy-terminated branches provided by said amine being capped with an acrylate-functional compound, and said polyacrylate-terminated oligomer being in admixture with an ultraviolet curable liquid acrylate or polyacrylate to provide the liquidity needed for application and to adjust the hardness or softness of the cured coating for the selected single coat or topcoat utility.

2. A coating composition as recited in claim 1 in which said polyacrylate-terminated oligomer constitutes at least about 30% up to about 80% of the reactive components in the coating.

3. A coating composition as recited in claim 1 in which said polyacrylate-terminated oligomer constitutes at least about 40% up to about 70% of the reactive components in the coating.

4. A coating composition as recited in claim 1 adapted for topcoat application in which said ultraviolet curable liquid comprises an acrylate-functional monomer whose homopolymer has a glass transition temperature above about 55° C. in the absence of acrylic acid.

5. A coating composition as recited in claim 1 adapted for topcoat application in which said ultraviolet curable liquid comprises a polyacrylate having a molecular weight below about 600.

6. A coating composition as recited in claim 1 adapted for single coat application in which said ultraviolet curable liquid comprises an acrylate-functional monomer, whose homopolymer has a glass transition temperature less than 0° C.

7. A coating composition as recited in claim 1 adapted for single coat application in which said ultraviolet curable liquid comprises an acrylate-functional monomer whose homopolymer has a glass transition temperature less than −20° C.

8. A coating composition as recited in claim 1 adapted for single coat application in which said ultraviolet curable liquid is a liquid linear aliphatic diacrylate in which the two acrylate groups are separated by at least a chain of 6 carbon atoms or by a molecular weight of at least 400 up to about 4000.

9. A coating composition as recited in claim 8 in which said two acrylate groups are separated by a molecular weight of from 600 to 2500.

10. A coating composition as recited in claim 9 in which said two acrylate groups are separated by a polyoxybutylene structure.

11. A coating composition as recited in claim 8 in which said linear liquid diacrylate is a polyoxybutylene glycol diacrylate having a molecular weight of from 800 to 2000.

12. A coating composition as recited in claim 1 in which said polyacrylate-terminated polyurethane oligomer has a molecular weight of about 1000 to about 8000 with one linking group selected from urethane and urea groups for every 300 to 900 units of weight.

13. A coating composition as recited in claim 1 in which said polyacrylate-terminated polyurethane polyurea oligomer is formed using diisocyanate in which a linear aliphatic chain containing at least 6 carbon atoms separates the two isocyanate groups, and this diisocyanate is reacted with a polyether or polyester containing alkylene groups having from 1 to 6 carbon atoms and a molecular weight in the range of 500 to 4000, to form a polyurethane diisocyanate.

14. A coating composition as recited in claim 13 in which said diisocyanate is provided by dimer fatty acid diisocyanate.

15. A coating composition as recited in claim 14 in which said dimer fatty acid diisocyanate contains 36 carbon atoms.

16. A coating composition as recited in claim 14 in which said diisocyanate is reacted with a polyether which is a polyoxyalkylene glycol having a molecular weight in the range of 1000 to 3000.

17. A coating composition as recited in claim 16 in which said oxyalkylene glycol contains 3 or 4 carbon atoms.

18. A coating composition as recited in claim 1 in which said acrylate-functional compound is 2-hydroxyethyl acrylate.

19. A linear polyacrylate-terminated polyurethane polyurea oligomer containing a linear polyurethane core terminated by urea formation with a polyhydroxy-functional amine containing a single isocyanate-reactive amino hydrogen atom, the plurality of hydroxy-terminated branches provided by said amine being capped with an acrylate-functional compound.

20. An oligomer as recited in claim 19 in which said polyacrylate-terminated polyurethane oligomer has a molecular weight of about 1000 to about 8000 with one linking group selected from urethane and urea groups for every 300 to 900 units of weight.

21. An optical glass fiber single coated with an ultraviolet-cured coating of the composition of claim 6.

22. An optical glass fiber single coated with an ultraviolet-cured coating of the composition of claim 8.

23. An optical glass fiber topcoated with an ultraviolet-cured coating of the composition of claim 4.

24. An optical glass fiber topcoated with an ultraviolet-cured coating of the composition of claim 5.

* * * * *